Patented Sept. 9, 1930

1,775,193

UNITED STATES PATENT OFFICE

JOHN V. FREEMAN, OF BELLEROSE, NEW YORK

COATING MATERIAL AND PROCESS

No Drawing. Application filed June 8, 1927. Serial No. 197,520.

In the making of composition shingles, it is common to apply a coating of granules made from slate and other materials. I have discovered a material which can be used for this and similar purposes, and a method of treatment by which certain raw materials can be converted into excellent materials for such coatings.

In certain coal mines in Illinois and other districts the coal beds are associated with fireclay formations. In getting out the coal, the fireclay has to be removed also, and is accumulated in dumps mixed with a certain quantity of coal. These dumps have been accumulating in some places for a number of years, amounting to about 300,000 tons in one instance. Spontaneous combustion of the coal in the dump has occurred, and with the oxidation of the iron pyrites present the fireclay has been calcined and under the conditions of heat and pressure has been formed into large clinker-like masses largely colored red by the iron oxide.

Although these clinker-like masses are formed largely of silicates, calcite, quartz, feldspar, kaolin, and mica together with iron oxides and thus have a chemical composition resembling broadly that of natural slate and rock, they differ radically in certain of their physical properties. The natural slates and rocks have a foliated or stratified structure with lines or planes of cleavage and a parallel arrangement of certain mineral constituents and have a low porosity particularly transversely to the planes of foliation or cleavage so that liquids tend to follow the lines of cleavage and form non-uniform stratified layers or to remain only on the surface of the rock. The clinker-like masses of the calcined coal dumps, on the other hand, a massive structure without foliations, parallel arrangements of mineral constituents or planes of cleavage and have a uniform porosity that is permeable with approximately equal facility in all directions so that an impregnating liquid will saturate granules of this material uniformly from the surface to the center.

I have discovered by actual tests that this material, which is now a waste product and a source of expense for its disposal, can be used as a coating for roofing instead of the more expensive material heretofore used. The material is ground to granules and applied to the roofing in the same way as ground slate. If we take the run of the bank or dump and grind it, we find that nearly all the particles have a color equally as good as commercial red slate. But there are some particles that are off color. The percentage of these can be much reduced by selecting the most suitable lumps or masses from the dump by sorting in the course of preparing the material for market.

The material may be used in the color in which it is found in the dumps or may be colored red as hereinafter described, or may even be treated to give it other colors such, for example, as green. The natural material occurs in mixtures, largely red, and may be ground and used in this condition. But for commercial reasons it is better to provide a substantially uniform color or colors, leaving the purchaser to make his own mixtures.

I have discovered also a process of treatment by which the whole material of the dump, or selected portions thereof, may be improved in color to such an extent as to be superior to the materials heretofore used. This is accomplished by increasing the content of iron oxide. The result is a pure bright red, much more attractive than the red of slates and other materials heretofore used, and I have produced a product of this improved color which is practically uniform and which under exposure to the atmosphere will not fade nor run. In this treatment I can also use a material which is a steel mill by-product of almost no value, namely, used pickling liquor. This is a neutral solution of ferrous sulphate. Such a solution may be made artificially for my purpose. But used pickling liquor from steel mills is made in large quantities and can be bought for very little more than the cost of transportation; so that with this material the by-product is extremely cheap.

A specific example of the process is the following:

A waste pickling liquor is used which is of a density of 30 degrees Baumé, no acidity, 10.54 per cent iron and 6.04 per cent sulphur. The degree of concentration as the liquor is produced in the steel mills or as concentrated for economical shipment, may be modified by evaporation or by addition of water. Generally the liquor produced at the mills is about 38 degrees to 40 degrees Baumé and will be diluted to about 30 degrees. This dilution is chiefly for convenience in treating the material. The material from the dump is ground into granules and sized to the desired ultimate size and is put into a tank of the liquor and left there from 12 to 24 hours. It is then withdrawn and dried and calcined or heated in rotary kilns for about 30 minutes or more at a temperature of about 500 to 550 degrees C. This develops what I believe to be the best color. The material is then ready for use in the usual way.

The liquor referred to above after use on one batch of the clay showed a concentration of 31 degrees Baumé, an iron content of 10.50 per cent and a sulphur content of 5.99 per cent. A very small quantity of the iron goes a long way in producing the desired color. The liquor may, therefore, be re-used on further batches of clay material, with or without the addition of iron sulphate or fresh liquor.

The product may be of different sizes according to the use to be made of it. For ordinary shingle coating it will be crushed and the fines removed leaving granules which pass through 10-mesh but not through 40. After heating to fix the color, they should be re-screened to eliminate the fines.

The same process may be applied with good results not only to the dull red particles which constitute the major part of the bank, but also to particles of other colors which occur, such as black, dark gray and greenish colors.

The particular temperature referred to above gives a bright red color. The color can be controlled, however, by varying the temperature. An increase of temperature to 1040 degrees C. causes the formation of the magnetic oxide of iron ($Fe_3O_4$) with a very attractive reddish brown color. Between these two the shade can be varied by varying the temperature and the length of time of calcination.

The solution of ferrous sulfate or of other coloring material penetrates through the surface uniformly to the central part of the granules and thus with a sufficient time for the penetration of the liquid the granules can be uniformly impregnated throughout, or to the very centre of the granules, and, upon calcining, colors the granules throughout with a corresponding uniformity and evenness of color. Through this perforation of the coloring medium the lack of uniformity that might be caused by surface abrasion, dusting or breakage of the granules, is avoided. The color of the granules can, therefore, not be impaired by wear or erosion of the granules.

Instead of the used pickling liquor referred to, the process may be carried out with any other solution of ferrous sulphate of about 5 per cent or more.

The specific process described has the advantage that the solution is absorbed in the natural or artificial silicates so as to be permanently adhered to or incorporated in the granules. The color is thus developed and fixed by the chemical reaction which is effected by the heat. The shade or depth of color may be modified at will by varying the concentration of the solution so that more or less of the coloring ingredient is absorbed as well as by varying the temperature of calcination as stated above.

The same method of coloring may be practiced on various other silicates and other colors as well as red may be produced by the absorption of the coloring ingredient and the bringing out of the color by subsequent reaction. And the subsequent reaction may be effected by heat or by the addition of suitable chemical agents or both. It is the reaction in situ which makes it possible to secure a substantially uniform and permanent color.

Various modifications may be made by those skilled in the art without departing from the invention as defined in the following claims.

What I claim is:

1. The process of modifying the color of ground calcined fireclay from coal mine dumps which consists in treating it with a solution of ferrous sulphate and calcining it.

2. The process of modifying the color of ground calcined fireclay from coal mine dumps which consists in treating it with a solution of ferrous sulphate and calcining it at a temperature of about 500 to 550 degrees centigrade.

3. The process of modifying the color of ground calcined fireclay from coal mine dumps which consists in treating it with used pickling liquor to increase its content of iron and calcining it to form iron oxide therein to heighten the color and to fix such color.

4. The process of modifying the color of ground calcined fireclay from coal mine dumps which consists in treating it with used pickling liquor to increase its content of iron and calcining it at a temperature of about 500 to 550 degrees centigrade.

5. The process of making a material for coating roofing or the like which consists in grinding the calcined clay from coal mine dumps to granules of the desired size, exposing the sized granular material to the action of a solution of ferrous sulphate and again calcining it.

6. The process of making a material for coating roofing or the like which consists in selecting from coal mine dumps, lumps or masses of calcined clay of approximately uniform color, grinding the same to granules of the desired size, exposing such sized granular material to the action of a solution of waste pickle liquor for several hours and then withdrawing it and drying and again calcining it to provide coloring matter, additional to that originally contained therein, by which the natural color is modified and rendered more uniform.

In witness whereof, I have hereunto signed my name.

JOHN V. FREEMAN.